April 2, 1968     S. B. APPLEBAUM     3,375,930
HOT PROCESS SOFTENERS
Filed March 15, 1966
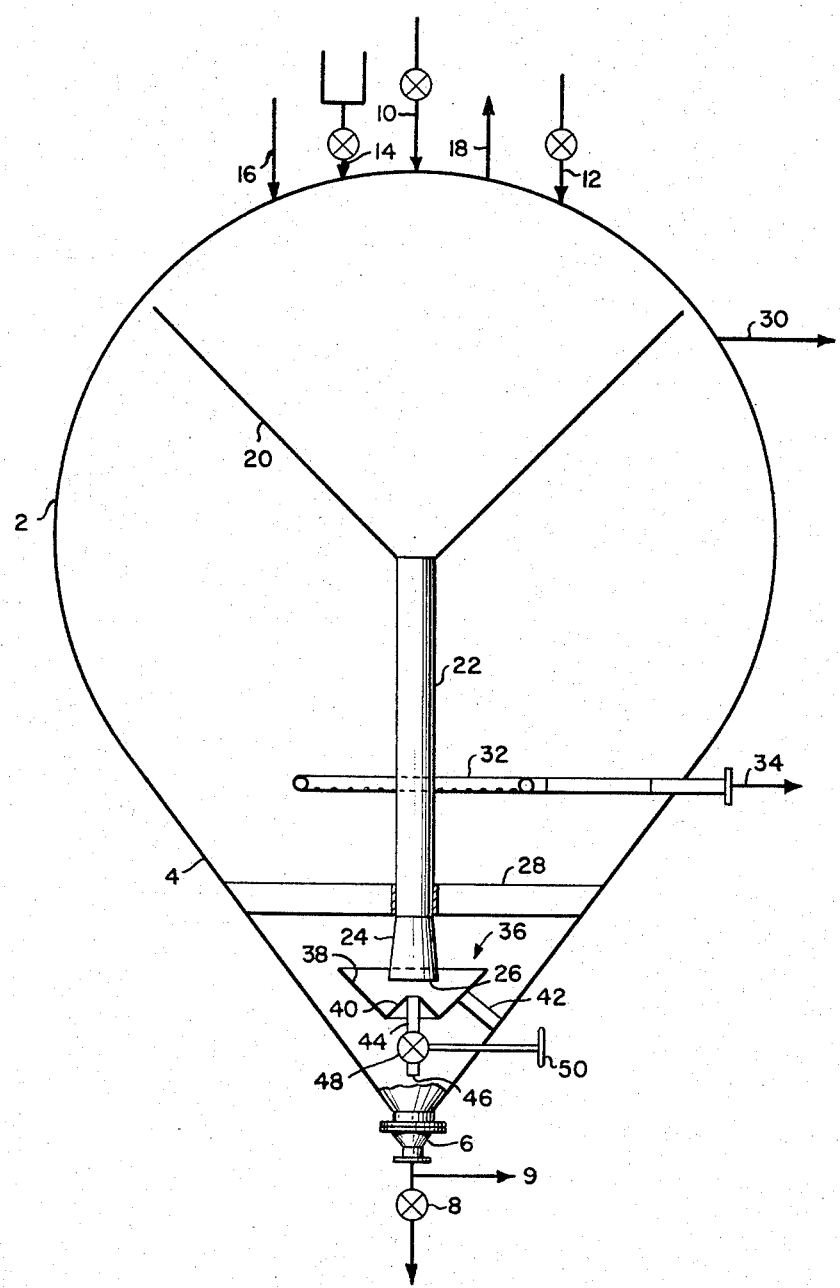
INVENTOR
SAMUEL B. APPLEBAUM
BY
ATTORNEYS

United States Patent Office 3,375,930
Patented Apr. 2, 1968

3,375,930
HOT PROCESS SOFTENERS
Samuel B. Applebaum, Philadelphia, Pa., assignor to Crane Co., Chicago, Ill., a corporation of Illinois
Filed Mar. 15, 1966, Ser. No. 534,366
1 Claim. (Cl. 210—207)

ABSTRACT OF THE DISCLOSURE

A hot process softener is provided with a downcomer terminating at an opening near the bottom of a downwardly converging conical region, at the bottom of which there is a blow-off connection. A sombrero-shaped baffle is situated below the opening of the downcomer, and a valved passage is provided permitting flow of liquid through the baffle to the region directly above the blow-off connection in order to control the accumulation of sludge.

---

This invention relates to hot process softeners and has particular reference to the maintenance of proper sludge blanket conditions in upflow type softeners.

The objects of the invention relate to maintenance of proper operating conditions for variable flow rates in the light of two functions of the apparatus which basically oppose each other. A sludge blanket must be maintained in proper condition for upflow therethrough of the water being treated. At the same time, settled sludge must be concentrated for blow-off to reduce the volume of hot blow-off water wasted to the sewer. Changes in velocity of flow through a downcomer produce an unbalance of these two desired conditions, and the invention provides a simple means for securing proper operation of a wide range of flow of treated water. Specific matters which are involved will be best made clear from the following description, read in conjunction with the accompanying drawing in which the figure is a diagrammatic vertical section through a softener embodying the invention.

Reference may first be made to those aspects of a typical softener which are old, the modification in accordance with the invention being a minor one. The softener illustrated comprises a tank 2 constructed to withstand what may be in practice considerable pressures. The upper portion of the tank may vary in form and size, but the lower portion is conical as indicated at 4 to provide flow velocity conditions optimum for operation as described later. The apex of the conical bottom is provided with an outlet 6 controlled by a valve 8 through which blow-off of sludge occurs either continuously or intermittently. The valve 8 may be automatically controlled. Additional sludge blow-off is provided from perforated pipe 32 and pipe 34 to waste.

The top of the tank is provided with various inflow connections which are conventional and merely diagrammed, these connections including a raw water inlet 10, a steam inlet 12 to effect heating, a chemical inlet 14 for the injection of precipitating chemicals, and a recirculated sludge inlet 16. At the upper portion of the tank there is also a vent 18 controlled in conventional fashion to provide for the escape of fixed gases, usually along with a minor amount of steam.

Interiorly of the tank there is provided a large cone 20 which divides it into two major compartments. The periphery of this cone may be spaced, at least at points, from the tank walls so that there is pressure equalization between the upper and lower chambers which it divides.

Extending downwardly from the vertex of the cone 20 is the downcomer 22 which is flared at 24 at the approach to its lower open end 26. The downcomer is supported by struts 28. Pertinent to the purpose of the invention is the consideration that the elements involved are ordinarily quite large and heavy. For example, a typical diameter of the downcomer may be two feet, and its lower end may have a diameter of the order of 2½ feet.

Outflow of the treated water takes place through a connection as indicated at 30 below the upper edge of the cone 20. Automatic level control is ordinarily provided to prevent the inflowing raw water from rising above the upper edge of cone 20. Recirculation of sludge is provided by withdrawing portions thereof through a connection in the blow-off line just above valve 8, as indicated at 9, communicating with a pump (not shown) which delivers the sludge to the top of the tank.

What has so far been described is essentially conventional, and reference will now be made to conventional operation which gives rise to problems.

In this operation a sludge blanket should be maintained within the conical lower portion 4 of the tank so that the water leaving the lower end of the downcomer will percolate upwardly through the sludge blanket. The particles forming this blanket are heavier that water so that in the absence of the upflow they would gradually settle into the lower apex of the cone. Due to the flow, however, in proper operation the blanket will be maintained with decreasing concentration of the solids thereof at the upper portion which is fairly well defined and substantially below the outlet, linear flow velocities decreasing as the water flows upwardly such that the particles at the top of the blanket may be considered as falling relative to the flow at the same velocity as the upward flow.

The invention is concerned with the physical aspects of the sludge blanket and consequently it will be unnecessary to describe in detail the chemical production of the sludge which is subject to wide variations depending upon the water treated. One of the simplest treatments involves the introduction of lime and soda ash. By this addition calcium and magnesium are precipitated. In other cases, caustic soda may be introduced. Gypsum may be introduced under conditions when alkalinity is much higher than hardness. Where high silica is a problem magnesium may be introduced in the form of activated oxide, magnesium sulfate, or as dolomitic lime. If oil, organic matter or turbidity are present various coagulants may be added such as ferric or ferrous sulfate, alum, sodium aluminate, or the like.

These and numerous other chemicals are commonly used depending upon the water being treated and the end results desired. From the physical standpoint, they have a common property of producing solid particles forming the sludge blanket. Inducing of the formation of particles of adequate size is promoted by the recirculation of part of the sludge which effects "seeding." The heating of the water during the processing promotes not only the formation of sludge but serves also to decompose bicarbonates which may be present.

In the conventional operation the clarified effluent at 30 generally flows to pressure filters to remove residual solid material, and these filters in various processes may be followed by zeolite treatment, addition of phosphoric acid, or the like. The blanket itself acts as a quite effective filter for solids, both organic and inorganic, which enter with the raw water.

The particular operational problem which arises in this type of softener is the sensitivity to flow rates. First, the softener is so designed that at maximum flow the sludge blanket is maintained at a proper considerable thickness to secure the desired length of flow path of the water through the blanket so that as it leaves the blanket, the desired reactions are completed as are also the filtering effects. However, if the flow rate drops substantially the upward velocity of the water will not be sufficient to maintain the vertical extension of the blanket, and the sludge tends to concentrate in the lower portion of the cone 4. If the flow rate becomes quite low the sludge blanket may extend little above the lower end of the downcomer, to become quite ineffective.

On the other hand, there is a desirable concentration of sludge in the lowermost portion of the cone 4 in order that blow-off may remove excessive sludge with a minimum of waste of hot water. If the velocity of flow through the downcomer is too high, this concentration of the sludge is prevented and the blanket may be effectively floating with its lower surface well away from the vertex of the cone 4. Flow velocities at the lower end of the cone should be reduced to such extent as to permit high sludge concentration for the blow-off.

It will be now apparent that ideally there should be a balance between the results of maintaining the sludge blanket thickness and of providing adequate concentration of sludge for blowoff. This would mean that desirably the lower end of the downcomer should be adjustable vertically to correspond to varying flow rates. This is not at all practical in view of the large size of the downcomer and the fact that the interior of the tank is generally under pressure.

Some improvement in the achievement of proper conditions may be effected by locating below the lower end of the downcomer a baffle arrangement such as indicated generally at 36 comprising an outer cone 38 converging downwardly but truncated at a connection with an inner cone 40 having its vertex pointing upwardly. This structure may involve a pair of pyramids made of metal plates rather than cones. By this arrangement the water flowing from the downcomer is diverted upwardly while at the same time between the lower portion of the cone 4 and the conical portion 38 of the baffle there is a relatively quiescent region in which concentration of the sludge may occur. This arrangement, however, is still not completely satisfactory, and for proper operation through wide variations of flow rate it would be necessary to change the relative positions of the lower end of the downcomer and the baffle assembly and their relations to the cone 4. Such mechanical adjustment is quite impractical for reasons already given, the baffle assembly itself being quite large with a typical maximum horizontal dimension of around seven feet.

In accordance with the invention a simple solution to the problem is provided, still utilizing the baffle assembly, by providing a vertical pipe connection at 44 to the region above the vertex of the cone 40, with this connection terminating at a location such as 46 in the lower portion of the cone 4 and with control of flow by a valve 48, for example of the butterfly type, variably opened and closed by a stem arrangement 50 extending through a suitable stuffing box in the wall of the cone 4. By adjustment of the valve opening, flow of water through the connection 44 may be controlled, the flow resulting from the approach velocity of the water leaving the lower end of the downcomer.

With this arrangement it is easy to control the sludge conditions over a very wide range of water flow. When the flow is at a maximum rate, the valve 48 may be closed. In such case the flow velocities will be such that the blanket is vertically extended as desired and the disturbances of the liquid will be such that undue concentration of the sludge in the lower end of the cone 4 will not occur, there being a proper concentration at this point desirable for blow-off.

With decrease of the rate of water inflow, there would be, with the valve 48 closed, an undue concentration of sludge exterior to and below the baffle assembly, this being at the expense of maintenance of concentration in the sludge blanket and of the vertical extent of the blanket. If the valve 48 is then opened to a sufficient extent there will be sufficient flow through the pipe connection 44 to stir up the sludge to the extent necessary to prevent too great a concentration at the apex of cone 4, the flow from the connection 44 passing upwardly to carry a proper proportion of the sludge above the baffle assembly into the main water flow and so serve to maintain proper concentration in an extent of the blanket. At the minimum flow rates the valve 48 may be fully opened to achive similar results. Valve opening may be calibrated in terms of water flow rates, or sludge sampling may be used as a guide to proper valve settings.

It will be evident that the provision of this easily manipulable and simple arrangement disposes of any necessity for adjustments of large and heavy parts to take care of varying flow rates.

It will be evident that various details in the practice of the invention may be changed without departing from its scope as defined in the following claim.

What is claimed is:

1. Water treatment apparatus of the upflow sludge blanket type comprising a tank having a bottom portion having an upwardly diverging wall to provide a region of upwardly increasing horizontal cross-section in which a sludge blanket is to be maintained, means for delivering downwardly into the lower portion of said region water containing sludge-forming material, a sludge blow-off connection at the bottom of said region, an effluent outlet well above the point at which water is delivered by said delivering means, thereby to form an extended space for maintenance of a sludge blanket within said region of upwardly increasing horizontal cross-section, means providing a baffle in said region of upwardly increasing horizontal cross-section and within the confines of said upwardly diverging wall above said blow-off connection but below the point of delivery of the water into said region to deflect the delivered water upwardly away from the blow-off connection and define a relatively quiescent zone above said blow-off connection for concentration of sludge at the blow-off connection, and means providing a controlled flow of water into the last mentioned zone thereby to control the accumulation of sludge therein, said means providing the controlled flow of water comprises a valved passage having a receiving end opening towards the flow leaving the first mentioned water delivering means and an outlet end opening into said quiescent zone so that said leaving flow produces flow through the passage into said quiescent zone.

References Cited
UNITED STATES PATENTS

| 958,832 | 5/1910 | Russell | 210—305 X |
|---|---|---|---|
| 1,179,658 | 4/1916 | Rothwell | 210—197 X |
| 1,602,052 | 10/1926 | Smith | 210—534 X |
| 2,860,786 | 11/1958 | Kittredge | 210—207 X |
| 3,184,065 | 5/1965 | Bradford | 210—535 X |

REUBEN FRIEDMAN, *Primary Examiner.*

J. DeCESARE, *Assistant Examiner.*